United States Patent [19]

Morrow et al.

[11] Patent Number: 4,866,881
[45] Date of Patent: Sep. 19, 1989

[54] AUTOMATIC DOOR SAFETY SYSTEM

[75] Inventors: Richard A. Morrow, Pinellas Park; Daniel C. Gionet, Pinellas Park; Lance Wikkerink; Harry V. Nguyen, both of St. Petersburg, all of Fla.

[73] Assignee: Lanson Electronics, Inc., Pinellas Park, Fla.

[21] Appl. No.: 200,534

[22] Filed: May 31, 1988

[51] Int. Cl.⁴ .............................................. E05F 15/20
[52] U.S. Cl. ............................................ 49/25; 49/28
[58] Field of Search ..................... 49/25, 31, 262, 263, 49/26, 28; 307/117

[56] References Cited

U.S. PATENT DOCUMENTS 4,009,476  2/1977  Lutz ........................................ 49/25
4,621,452  11/1986  Deeg ....................................... 49/25

Primary Examiner—Kenneth J. Dorner
Assistant Examiner—Gerald A. Anderson
Attorney, Agent, or Firm—Walter J. Monacelli; Joseph H. Teagno

[57] ABSTRACT

A system for controlling the opening and closing operation of a sliding door wherein at least two presence sensing detectors are disposed effective to cast beams in overlapping relation to one another and extending across the pathway of the door to be controlled, and manual means or motion detecting detectors effective to provide for the initiation of movement of the door to open position. Furthermore programmed computer means are included in the system for the controlled sequencing and pulsing of the presence sensing beams in the opening and closing operation of the door.

21 Claims, 2 Drawing Sheets

AUTOMATIC DOOR SAFETY SYSTEM

BACKGROUND OF THE INVENTION

1. Field of the Invention

The invention relates to automatically movable sliding doors and more particularly to a safety system for the controlled operation thereof and constitutes a distinct improvement over U.S. application Ser. No. 07/038,957 assigned to the same assignee as this application.

2. State of the Prior Art

Although automatic operation of sliding doors is well known as generally represented by U.S. Pat. Nos. 4009476, 40291176, 4621452, and 4706227, British Pat. No. 1418106 and West Germany Pat. No. 3202784, none of the inventions covered thereby approach the developments covered hereby. The present invention is distinctive from the prior art in that it includes safety means operable to control object presence detecting beams by the opening or closing movement of the door or doors with the beams projected in the threshold of the doorway and having a portion of each beam extending a predetermined distance on each side of the doorway. The improvement herein over U.S. application Ser. No. 07/038,987 resides in the utilization of computer means for the fast and consecutive operation of beam emitting transducers in the opening and closing of the door or doors.

SUMMARY OF THE INVENTION

The automatic door operating system covered hereby is primarily concerned with safety while at the same time providing effective control means for the operation thereof.

The system of this invention is adaptable to using a conventional door continuous motion sensing beam for the automatic initial opening of the sliding door, although manually actuated means may alternately be employed for effecting opening of the door. Furthermore the system as applied to a sliding door structure employs at least two ultrasonic transducers mounted on the header of the door frame for transmitting presence detecting beams across the threshold or center path of the doorway with which the system is included, that is the beams are adapted to be projected to cover the door opening as completely as possible when all transducers are in beam-producing operation. The transducers are so arranged as to project their conical produced beams in overlapping relation to one another and with one edge of some of the beams, depending on the number employed, being substantially vertical, the purpose of which will hereinafter appear.

Each of the transducers produces a cone-shaped beam of high frequency ultrasonic energy and acts as a transmitter and receiver of sound pulses effective upon the presence of an object in its beam. Appropriate circuits, employing a computer in the system, control the sequencing, timing and duration of the sound pulses. The transducers are actuated solely upon a predetermined movement of the door, together with the program written in the computer, to turn them on and shut them off. After manually actuated means or the continuously on motion detecting beam means is activated, the door moves from closed to full open position and the movement of the door, through appropriate switch means provided, turns on each transducer in succession, thereby providing presence sensing beam protection during the continued opening of the door from closed to open position.

In order to keep each transducer operating as long as possible when the door is moving, sensors and circuits are employed to shut off or turn on each transducer in succession just ahead of the moving door in closing and just behind during the opening operation. This is to assure that the transducer or transducers, as the case may be, next in succession will continue to operate effectively to detect presence in the beam, if such should occur. If there is no presence in each successive presence sensing beam, the door will continue to its closed position with the last beam beeing shut off just before the door passes under the transducer therefor.

When a beam of conventional type is employed for initiating movement of the door to which the present system is applied, and when an object interrupts the beam, it is a beam of the micro-wave motion sensing type and can cover a wide range sufficient to span the width of the door opening. In this way it is possible to intercept any moving object interrupting the beam and actuate the power means for operating the door to open position. By reason of applying this system it is preferred to have similar or identical conventional micro-wave beam means on both sides of the door whereas the ultrasonic transducer produced beams are arranged to cast their beams in the doorway into which the sliding door moves.

By reason of the nature of the beams produced by the ultrasonic transducers they are limited as to area they can cover; thus it is preferable to use more than one transducer effective to have each cover a certain area of substantially conical shape beam. With the multiple beams produced being in overlapping relation to one another the beams are capable of covering the threshold of the doorway while simultaneously spanning the width of the doorway.

When the door is closed, the ultrsonic beams are off whereas the micro-wave motion sensing beams remain in continuous operation. Upon the movement of an object or person into either of the micro-wave beams produced, movement of the door to open position results from power mechanism actuated by the micro-wave producing means. As long as the object moves in a path toward the door opening, the door opens fully and remains open. As the door moves to predetermined positions in its opening cycle, appropriate switch means in the electrical circuitry of the system are successively tripped by the door's movement to put on the ultrasonic beams in a specific computer programmed manner, to be hereinafter explained. If an object or person mives or stops in the doorway, the ultrasonic beams being active under object presence will effectively maintain the door open until the object clears the doorway and out of range of all ultrasonic beams. The continued movement of the object beyond either of the micro-wave beams will at this point allow the door to close. During the closing movement of the door, the switches, tripped during the opening movement of the door to place the ultrasonic beams in operation, act to close off these beams successively in a predetermined computer programmed manner. The switches provided can be of the magnetic type, including an element arranged on the inner end of the door adapted for magnetic association with appropriate elements spaced on the door header in close proximity ahead of each ultrasonic transducer in the door opening direction of movement of the door.

By prearrangement time delay is provided such that the door can move a limited distance into the beam of each successive ultrasonic transducer withoiut falsely causing the door to once again open as would be the case if not for particular control circuitry provided. Furthermore the programmed computer forming a part of the electrical circuit is capable of avoiding cross talk among the beams forming a part of the system or from other beams that might be present in other mechanisms nearby the system covered hereby. The computer as programmed also provides a system that is self calibrating and self testing.

An object of the invention is the provision of a system for controlling the operation of an automatic actuated sliding door which includes object presence beams arranged across the doorway through which the door moves and computer means for controlling the operation of the beams.

Another object of the invention is the provision of a system for controlling the opening and closing of an automatically operated sliding door wherein ultrasonic beams are adapted to be sequentially operated as dictated by a programmed computer included in the system.

A further object of the invention is the provision of a system for controlling the movement of a sliding door wherein motion detection beams are disposed on each side of the doorway for the door and presence detection beams are disposed in the doorway with the beams in overlapping relation, such that the motion detection beams are in continuous operation whereas the presence detection beams are turned off and on in a predetermined manner by switch means and a programmed computer means included in the system.

The description of this invention is facilitated by reference to the drawings.

DESCRIPTION OF THE PREFERRED EMBODIMENT

Figure 1:
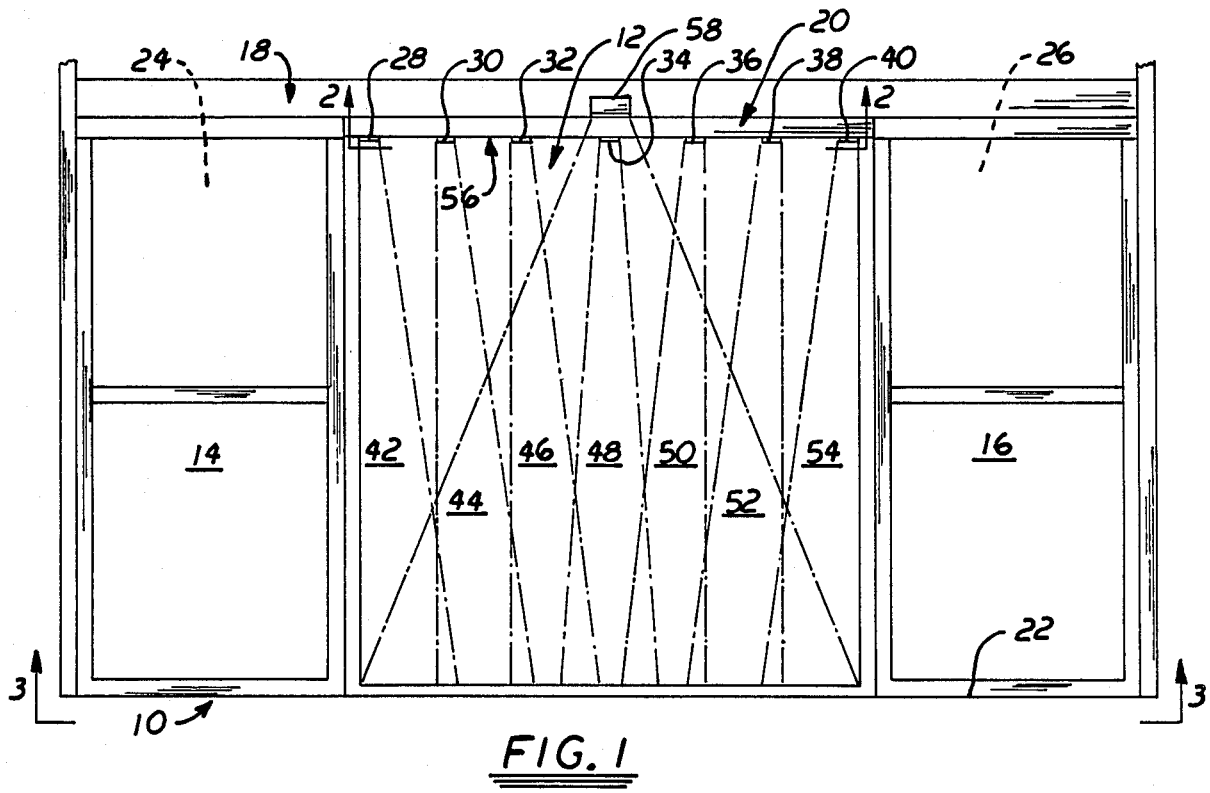
FIG. 1 is a fragmentary front plan view of door arrangement embodying the invention.

FIG. 1 is a front plan view of an automatic operated sliding door arrangement 10, comprising a doorway opening 12 framed by side panels 14 and 16, header 18, a channel member assembly 20 mounted on the underside of header 18, a floor 22 and sliding doors 24 and 26 arranged respectively when in open position behind side panels 14 and 16.

Figure 3:
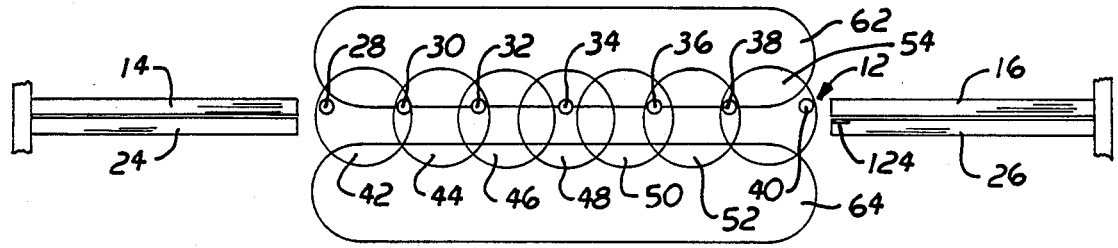
FIG. 3 is a view taken along lines 3—3 of FIG. 1.
Figure 2:
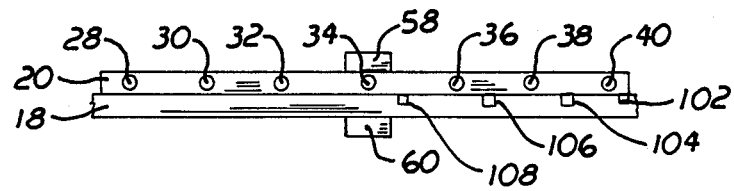
FIG. 2 is a view taken along lines of 2—2 of FIG. 1.
Figure 4:
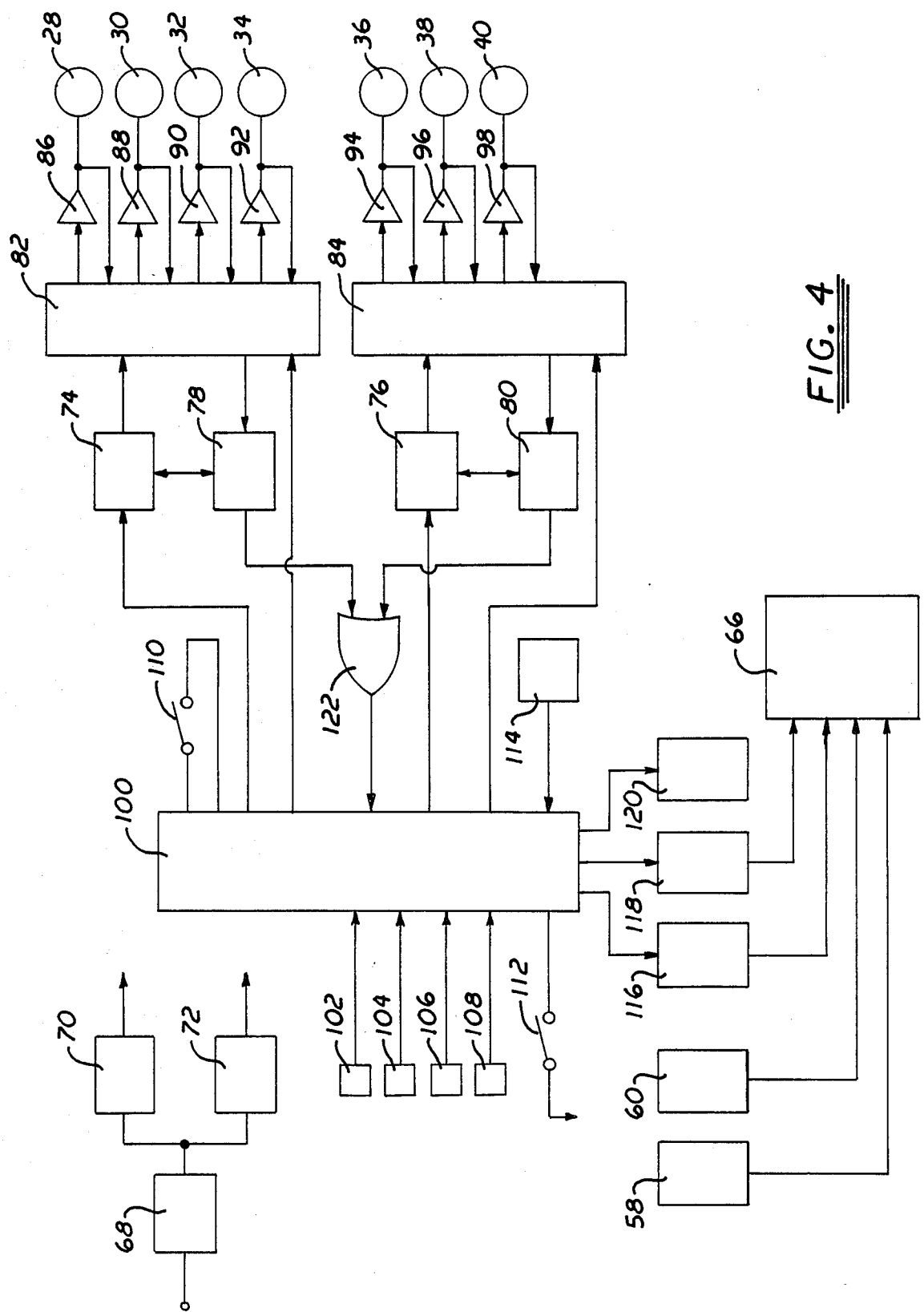
FIG. 4 is a block diagram of the electrical system for controlling the operation of the automatic door system covered hereby.

Channel assembly 20 houses the circuitry of the invention disclosed by FIG. 4, which includes ultrasonic transducers 28, 30, 32, 34, 36, 38 and 40 each effective when in operation to produce a cone of high frequency sound represented respectively by beams 42, 44, 46, 48, 50, 52 and 54 as disclosed in FIGS. 1 and 3. The beams are conical in form but by reason of their mounting arrangement, to be hereinafter explained, the largest end of each beam is not circular. As noted the transducers 28, 30, 32, 34, 36, 38 and 40 are arranged to project their beams from the underside 56 of channel assembly 20 toward floor 22 but ending at a predetermined distance from the floor so as to prevent a false signal of detection. These beams are provided in predetermined desired overlapping relation successively each one to the next one and effective as a group to appropriately span the doorway along the path of movement of the sliding door and extending a desired predetermined distance on each side of the doorway. As so arranged the beams eliminate gaps or voids for otherwise escaping detection of any object moving or stationary in the doorway. Each transducer acts as a transmitter and receiver of sound pulses emitted thereby and the circuit within which they are included, to be hereinafter described, provides means for controlling the timing and duration of the pulses.

Micro-wave motion detectors 58 and 60 are mounted on the header 18 on opposite sides of the doorway for producing motion sensing beams 62 and 64. These detectors are of conventional design of the type in general use for opening automatically operated doors. The wave beams 62 and 64 as noted are capable of being projected over a wide span and length effective as noted in FIG. 3 to cover an area completely spanning the width of the doorway and extending in front of the doorway on each side thereof a sufficient distance to effectively intercept an object or person a desired distance from the door. It is to be also noted that the micro-wave beams overlap the ultrasonic beams, the purpose of which will hereinafter appear.

As shown by block diagram of the electrical, computer system FIG. 4, ultrasonic transducers 28, 30, 32, 34, 36, 38 and 40 and micro-wave motion detectors 58 and 60 are incoporated therein. The motion detectors 58 and 60 are connected to the door control system 66, such that with the beams 62 and 64 in continuous operation and with appropriate power supplied to the system the doors 24 and 26 are operated to move from closed to open position if either of the beams 62 or 64 is intercepted by a moving object, be it animate or inanimate. A 24 volts AC source supplied to a bridge rectifier and filter 68 is rectified thereby and through appropriate voltage regulators 70 and 72 for supply of respective 5 and 8 volts to various parts of the system. So as to eliminate the need to disclose a great number of lines to designate current flow, which might be confusing it has been elected to recite current flow herein as follows: current flows from 5 volt regulator 70 to transmitters 74 and 76, receivers 78 and 80, solid state switches 82 and 84, transducer drivers 86, 88, 90, 92, 94, 96 and 98 and computer 100, whereas current flows from 8 volt regulator to transducers 28, 30, 32, 34, 36, 38 and 40 and to sensors 102, 104, 106 and 108.

Reset switch 110, limited opening switch 112, power on reset circuit 114 are connected to computer 100, as are door control relay and LED Red 116, limited opening relay 118 and computer monitor LED Green 120. Door control relay and LED Red 116 and limited opening relay 118 are further connected to door control system 66. Sensors 102, 104, 106 and 108 are directly connected to the computer 100 whereas the solid state switches 82 and 84 are connected through transmitter 74 and 76 respectively to the computer 100. Solid state switches 82 and 84 are also connected to computer 100 respectively through receivers 78 and 80 and then through an "or" gate 122.

It is to be noted that transmitter 74 and receiver 78 control 3 transducers, whereas transmitter 76 and receiver 80 control 3 transducers. Although this system includes seven transducers and four sensors, this number can be varied depending on the width of the door opening to be controlled. Further although this system discloses two doors which move from adjoining relation in the closed position of the doors and doorway because of the greater width of the doorway, it is suitable to apply this system to a single door for controlling a narrower door opening.

The computer controls the operation and sequencing of the systems upon input from the sensors 102, 104, 106, and 108 after their being tripped by a magnet 124 arranged on door 26 as the door moves from closed to open position and the reverse thereof. The computer further controls the analog solid state switches 82 and 84, the transmit/receive functions of transmitters 74 and 76, receivers 78 and 80, the relays 116 and 118 and the Red and Green LED's. The reset switch 110 will initiate a re-calibrate cycle of the system when is manually depressed, as will a power on/off cycle. Limited opening switch 112 is operative to tell the computer to stop the doors opening cycle and the limited opening relay 118 is closed when the computer commands the door to stop. Door control relay 116 is closed whenever the system senses an object or when the system is holding the door open for calibration or to signal a detected malfunction. Control relay 116 is operative likewise as motion detectors 58 and 60 to command the doors to open. Both relay 116 and 118 are connected to the door control to provide the above-stated operation.

Whereas the Red LED when on and arranged visibly externally of the channel assembly 20 indicates that the door control relay 116 is closed or activated, the Green LED arranged also externally of Channel 20 or other suitably visible place flashes at a periodic rate to indicate the computer is cycling normally and also for certain self test indicator functions.

Computer 100 includes a central processing unit, RCA part number CDP1802, a random access memory unit, Toshiba part number TMM2016BP, a Texas Instrument part number TMS27C128, programmable read only memory unit, into which applicant has written his program, and an interface module including standard latches, solid state switches, gates and relay drivers. The above units aside from applicant's program are all procurable off-the-shelf as standard parts and constitute the computer which together with the other parts of the system provide for the desired operation of the sliding doors as hereinafter defined.

Operation of the System

In the normal operation of the doors 24 annd 26 the system is placed in the on mode wherein the microwave detectors 58 and 60 are continuously in operation and producing beams 62 and 64. As such and with the absence of any object moving in either of beams 62 or 64, doors 24 and 26 remain closed thus completely blocking doorway or opening 12. At this stage the transducers 28, 30, 32, 34, 36, 38 and 40 remain in off condition. Upon the movement of an object into either beam 62 or 64, the motion sensing ability of said beam excites the door control system 66 effective to move the doors 24 and 26 to open position. With the movement of the doors and particularly door 26, magnet 124 on door 26 in movement from closed to open position, engages sensors 108, 106, 104 and 102 and places the transducers in beam producing condition as predeterminedly provided by computer 100. Sensor 108 controls transducer 34, whereas sensor 106 controls transducers 32 and 36, sensor 104 controls transducers 30 and 38 and sensor 102 controls transducers 28 and 40. As the door 26 moves to a position wherein sensor 108 is engaged, the computer is programmed to place transducer 34 in operative mode effective to produce beams 48, 46 and 50, 44 and 52, and 42 and 54 in a transmit sequence and pulsing. With the presence of an object in either of the beams and the continued opening of door 24 and 26, the sensors 106, 104 and 102 are successively engaged and their respective transducers are actuated to continue to produce the aforesaid beams in a continuous sequence and pulsing. During the full opening cycle of the doors, the transmit sequence for the transducers is 34, 32 and 36, 30 and 38, and 28 and 40; 34, 32 and 36, 30 and 38, and 28 and 40, and repeating as necessary. When the doors are all the way open, the transmit sequence for the transducers is 28 and 40, 28 and 40, 28 and 40, 30 and 38, 28 and 40, 28 and 40, 28 and 40, 32 and 36; 28 and 40, 28 and 40, 28 and 40, and 34 and repeating as necessary. As the door moves to closed position and the leading edge of door 26 is between sensors 102 and 104, the transmit sequence of transducers is 30 and 38, 30 and 38, 30 and 38, 32 and 36, 30 and 38, 30 and 38, 30 and 38, 34; and repeating as necessary. When the leading edge of the door and magnet 124 is between sensors 104 and 106, the transmit sequence is 32 and 36, 32 and 36, 32 and 36, 34, and repeating as necessary. With the edge of the door between sensors 106 and 108, the transmit sequence of the transducers is 34, 34, 34, 34, 34, and repeating as necessary. When the edge of the door passes sensor 108 and the doors move to closed position with the leading edge of doors 24 and 26 in juxtaposition, all the transducers are turned off. The transducer sequences as above defined are transmitted every 31 to 50 milliseconds. With this transducer sequencing it is possible to detect the target much more rapidly directly in front of the door.

Through the operation of the transducers as above defined, the proper and appropriate opening or closing of the doors is attained such that an object being present in any of the beams produced by the transducers will properly open the doors and likewise with the absence of such object the doors will close. Further if an object is detected in a particular beam, a second transmit cycle is initiated for the transducer producing the beam between 35 and 45 milliseconds for a second look. In this manner the beams produced eliminate any cross-talk between each other and any other extraneous produced waves in close proximity that might otherwise affect the desired opening and closing cycle of the doors.

The computer 100 provides the system with the capability of being self calibrating and self testing throughout various phases of operation of the system in that the beams are established to project a distance approximately 4 inches from the floor and further provide for the full opening of the doors should the system detect malfunctioning of the transducers, sensors, etc. Reset switch 110 which is manually operable can be actuated to open the doors and allow the system to run a new calibration. The system is further programmed so that no calibration can occur if there is an object in the doorway, and will not calibrate until the object is removed.

With reference to FIG. 3 which shows the ends of the beams as circular, it is to be noted that the large ends of the beams are actually elliptical and not circular by reason of the position at which the projecting ends of the transducers are placed so as to provide for an appropriate beam in case of each transducer to be beamed across the mid point of the door path across the doorway and proper overlapping relation to each other, since the transducers are arranged above the doorway and to one side of the doors.

It is to be noted further that beams 42, 44, 46, 50, 52 and 54 have one side of the beams as viewed in FIG. 1 substantially perpendicular to floor 22 and with each successive beam overlapping the next beam a predetermined desired amount. With these beams so arranged the doors 24 and 26 in their movement to closed position reach the position of the first and next adjacent beams directly after said beams are extinguished. This occurs as magnet 124 on door 26 successively engages sensors 102, 104 and 106, with beams 42 and 54, 44 and 52, and 46 and 54 simultaneously operable as pairs. Beam 48 is arranged centrally between the presence sensing beams on each side thereof in overlapping relation to beams 46 and 50 and is controlled to on/off condition by magnet 124 engaging sensor 108.

Although the disclosures herein relate to a two door operation in view of the width of the doorway provided, the system is applicable to a single sliding door and further the number of transducers and sensors depends upon doorway opening size.

Accordingly it is to be appreciated that while the description is specific to the disclosure presented, the drawings are merely illustrative, and variations are conceivable within the scope of the aforesaid description and the appended claims are intended to define same.

What we claim is:

1. An automatic sliding door structure comprising a door adapted to be mounted for movement in the doorway of a support structure, a plurality of presence sensing beam producing transducers arranged to produce presence sensing beams in overlapping relation to one another, spanning the path of movement of the door and extending at least a predetermined distance on each side of the doorway, power means for actuating the door, means actuated upon movement of the door in both directions of movement for switching the transducers on sequentially in the door opening mode and for switching the transducers off sequentially in the door closing mode and means providing a predetermined pulsing of the transducers and the beams produced thereby.

2. A door structure according to claim 1 wherein an electrical system is provided including the transducers and power means therein, switches for controlling operation of the transducers and the switches being tripped by means attached to the door on the leading edge thereof.

3. A door structure according to claim 1 wherein the transducers are mounted on the support structure above the doorway with the beams from the detectors being cast downward and wherein the transducers are in off condition when the door is closed.

4. A door structure according to claim 1 wherein a motion sensing detector is mounted above the doorway effective at all times to cast a beam to one side of the doorway in partial overlapping relation to the beams produced by the transducers.

5. A door structure according to claim 1 wherein the means providing for the sequencing and pulsing operation of the transducers is a pre-programmed computer.

6. A system for a sliding door structure, which comprises side boards, a header connecting the side boards, a floor on which the structure is mounted, a sliding door movable to open and closed position in the doorway formed by the header, side boards and floor, presence sensing detectors mounted on the header effective when on to produce presence sensing beams in overlapping relation to one another and extending at least a predetermined distance on each side of the doorway in the pathway of movement of the door, switches with each of the detectors for controlling their operation, means on the door for tripping the switches on in a door opening condition and for tripping the switches off in a door closing condition and means for the predetermined sequencing and pulsing actuation of the detectors and the beams produced thereby as controlled by the actuation of the switches.

7. A system according to claim 6 wherein at least one motion sensing detector is mounted on the header effective to produce a motion sensing beam cast to one side of the doorway in partial overlapping relation to the presence sensing beams and spanning substantially the width of the doorway opening.

8. A system according to claim 6 wherein the means for pulsing the detectors is a pre-programmed computer.

9. A system according to claim 7 wherein another motion sensing detector is mounted on the header for producing a sensing beam on the opposite side of the doorway from the beam produced by the first motion sensing detector.

10. A system according to claim 7 wherein the motion sensing detector is provided to be in continuous beam producing mode wherein the presence sensing detectors are placed in on and off operation by the movement of the door.

11. Control mechanism for an automatic sliding door having power means for moving the door from closed to open position and the reverse thereof comprising at least two object presence sensing transducers arranged above the door and spaced from one another effective when on to each produce an object sensing beam in overlapping relation to one another and spanning the pathway of movement of the door and extending a predetermined distance on each side of the doorway, means actuated by the movement of the door to place the transducers in beam producing relation such that upon opening movement of the door the transducers are placed in operation as the leading edge of the door passes each of the transducers and upon closing movement of the door the transducers are shut off as the leading edge of the door approaches the transducers and means providing for the sequencing and pulsing actuation of transducers in a predetermined manner as they are operated.

12. Control mechanism according to claim 11 wherein the transducers produce ultra-sonic beams.

13. Control mechanism according to claim 11 wherein the transducers are arranged in spaced alignment in the path of movement of the door.

14. Control mechanism according to claim 11 wherein upon movement of the door to open position the transducers are pulsed in consecutive sequence and upon movement of the door to closed position, the first transducer which the door approaches is pulsed a plurality of times prior to the pulsing of the next adjacent transducer in the closing path of movement of the door.

15. Control mechanism according to claim 14 wherein each of the transducers is associated with a sensor for the controlled operation of the transducer and means on the door for engaging the sensors in spaced apart relation upon movement of the door.

16. Control mechanism according to claim 15 wherein the means for regulating the pulsing of the transducers is a pre-programmed computer.

17. Control mechanism according to claim 16 wherein power means for moving the door are provided.

18. Control mechanism according to claim 17 wherein motion sensing detectors are provided mounted above the doorway within which the door slides for casting motion sensing beams on opposite sides of the doorway, said beams each intercepting portions of the beams cast by the transducers and extending along substantially the length of the doorway.

19. Control mechanism according to claim 18 wherein more than one door can be provided arranged to slide toward and away from each other, more than two object presence sensing transducers can be utilized to project a like number of presence sensing beams, a plurality of sensors one for at least half of the transducers used.

20. Control mechanism according to claim 18 wherein the presence sensing transducers produce ultra-sonic beams, the motion sensing detectors produce micro-wave beams and an electrical current supplied circuit includes the transducers, the sensors, the detectors, the power means and the pre-programmed computer.

21. Control mechanism according to claim 20 wherein the detectors are always in motion sensing operation effective to provide for the opening of the door when an object moves into the motion sensing beams and the presence sensing transducers upon being operated to produce object presence sensing beams continue to allow for the opening movement of the door if an object is sensed in any of the transducer produced beams, and means in the computer effective to limit the extent of opening of the door if the object is either not sensed by the transducer beam or beams and further is no longer in the beams cast by the detectors.

* * * * *

UNITED STATES PATENT AND TRADEMARK OFFICE
CERTIFICATE OF CORRECTION

PATENT NO. : 4,866,881

DATED : Sept. 19, 1989

INVENTOR(S) : Richard A. Morrow, Daniel C. Gionet, Lance Wikkerink, Harry V. Nguyen It is certified that error appears in the above-identified patent and that said Letters Patent is hereby corrected as shown below:

On the title page, in the Attorney, Agent, or Firm section, correct "Joseph H. Teagno" to read "Joseph R. Teagno".

Col. 2, line 52, correct "mives" to read "moves".

Col. 5, line 14, before "is" insert "it".

Signed and Sealed this

Twenty-fourth Day of July, 1990

Attest:

HARRY F. MANBECK, JR.

Attesting Officer

Commissioner of Patents and Trademarks